(12) United States Patent
Ma

(10) Patent No.: US 11,245,855 B2
(45) Date of Patent: Feb. 8, 2022

(54) HANDHELD GIMBAL AND SHOOTING CONTROL METHOD FOR HANDHELD GIMBAL

(71) Applicant: SZ DJI TECHNOLOGY CO., LTD., Shenzhen (CN)

(72) Inventor: Tianhang Ma, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/329,126

(22) Filed: May 24, 2021

(65) Prior Publication Data

US 2021/0281764 A1 Sep. 9, 2021

Related U.S. Application Data

(63) Continuation of application No. PCT/CN2018/117963, filed on Nov. 28, 2018.

(51) Int. Cl.
*H04N 5/232* (2006.01)

(52) U.S. Cl.
CPC ....... *H04N 5/23299* (2018.08); *H04N 5/2328* (2013.01); *H04N 5/232935* (2018.08)

(58) Field of Classification Search
CPC ......... H04N 5/23299; H04N 5/232935; H04N 5/2328; F16M 13/04
USPC .................................................. 348/207.99
See application file for complete search history.

(56) References Cited

U.S. PATENT DOCUMENTS

| | | | |
|---|---|---|---|
| 9,280,038 B1* | 3/2016 | Pan | A45F 5/10 |
| 9,903,533 B2* | 2/2018 | Wei | F16M 13/04 |
| 10,084,951 B2* | 9/2018 | Lee | H04N 5/23299 |
| 10,366,525 B2* | 7/2019 | Pao | G06T 13/40 |
| 10,425,579 B2* | 9/2019 | Paul | G06Q 50/01 |
| 10,451,705 B2* | 10/2019 | Irie | G01S 3/7864 |
| 10,630,878 B2* | 4/2020 | Lee | H04N 5/23299 |
| 10,638,041 B2* | 4/2020 | Kim | H04N 5/23296 |

(Continued)

FOREIGN PATENT DOCUMENTS

| CN | 102999051 A | 3/2013 |
|---|---|---|
| CN | 204420520 U | 6/2015 |

(Continued)

OTHER PUBLICATIONS

The World Intellectual Property Organization (WIPO) International Search Report for PCT/CN2018/117963 dated Aug. 27, 2019 8 Pages (including translation).

*Primary Examiner* — Pritham D Prabhakher
(74) *Attorney, Agent, or Firm* — Anova Law Group, PLLC

(57) ABSTRACT

A shooting control method includes determining a handheld gimbal is in a selfie mode, determining characteristic information of a target object, controlling a shooting device of the handheld gimbal to track and shoot the target object according to the characteristic information of the target object, determining position information of the target object in a shooting image according to the characteristic information of the target object, adjusting a control parameter of the shooting device according to the position information of the target object in the shooting image, to enable the shooting device to shoot the target object in a preset configuration to obtain the shooting image, and displaying the shooting image in real time on a display screen of the handheld gimbal.

20 Claims, 11 Drawing Sheets

(56) References Cited

U.S. PATENT DOCUMENTS

| | | | |
|---|---|---|---|
| 10,983,420 B2* | 4/2021 | Lan | F16M 11/123 |
| 11,016,371 B2* | 5/2021 | Zhang | F16M 13/04 |
| 2006/0055790 A1* | 3/2006 | Chen | H04N 5/23203 |
| | | | 348/211.2 |
| 2009/0003822 A1* | 1/2009 | Tyner | G03B 17/563 |
| | | | 396/428 |
| 2010/0079101 A1* | 4/2010 | Sidman | F16M 11/041 |
| | | | 318/649 |
| 2010/0264283 A1* | 10/2010 | Stoffel | F16M 13/00 |
| | | | 248/178.1 |
| 2013/0005401 A1* | 1/2013 | Rosenhan | G06F 1/1632 |
| | | | 455/557 |
| 2013/0050487 A1* | 2/2013 | Omer | H04N 7/185 |
| | | | 348/144 |
| 2013/0176412 A1* | 7/2013 | Chen | F16M 11/041 |
| | | | 348/77 |
| 2014/0037281 A1* | 2/2014 | Carney | F16M 11/28 |
| | | | 396/421 |
| 2015/0071627 A1* | 3/2015 | Hoang | F16M 11/10 |
| | | | 396/421 |
| 2016/0083110 A1* | 3/2016 | Pan | A45F 5/10 |
| | | | 348/144 |
| 2017/0039671 A1 | 2/2017 | Seo et al. | |
| 2017/0118415 A1* | 4/2017 | Gao | H04N 5/23219 |
| 2018/0017659 A1 | 1/2018 | Irie | |
| 2018/0115716 A1* | 4/2018 | Gubler | H04N 5/23258 |
| 2018/0234611 A1* | 8/2018 | Lee | H04N 5/23299 |
| 2018/0259123 A1* | 9/2018 | Shim | G03B 17/563 |
| 2019/0082932 A1* | 3/2019 | Schoonbaert | A61B 1/00048 |
| 2019/0096112 A1* | 3/2019 | Pao | G06T 17/00 |
| 2019/0137852 A1* | 5/2019 | Li | F16M 11/2064 |
| 2019/0208115 A1* | 7/2019 | Paul | H04N 5/232 |
| 2019/0228505 A1* | 7/2019 | Douady-Pleven | H04N 5/2328 |
| 2019/0246038 A1* | 8/2019 | Kim | H04N 5/23245 |
| 2019/0279681 A1* | 9/2019 | Yuan | G11B 27/031 |
| 2020/0041878 A1* | 2/2020 | Lan | G03B 17/563 |
| 2020/0124949 A1* | 4/2020 | Zhang | G03B 17/563 |
| 2020/0275018 A1* | 8/2020 | Zhang | H04N 5/2251 |

FOREIGN PATENT DOCUMENTS

| | | |
|---|---|---|
| CN | 105443956 A | 3/2016 |
| CN | 105654512 A | 6/2016 |
| CN | 105678809 A | 6/2016 |
| CN | 105979133 A | 9/2016 |
| CN | 106331471 A | 1/2017 |
| CN | 107888818 A | 4/2018 |
| CN | 108184061 A | 6/2018 |
| CN | 207634925 U | 7/2018 |
| CN | 108513608 A | 9/2018 |
| CN | 108702458 A | 10/2018 |
| WO | 2018058774 A1 | 4/2018 |

* cited by examiner

HANDHELD GIMBAL AND SHOOTING CONTROL METHOD FOR HANDHELD GIMBAL

CROSS-REFERENCE TO RELATED APPLICATION

This application is a continuation of International Application No. PCT/CN2018/117963, filed Nov. 28, 2018, the entire content of which is incorporated herein by reference.

TECHNICAL FIELD

The present disclosure relates to the field of gimbal and, in particular, to a handheld gimbal and a shooting control method for the handheld gimbal.

BACKGROUND

In the existing technology, when a user uses a handheld gimbal for shooting, it is needed to manually capture an object and place a target object in a suitable position on a shooting image. However, when the object is always in motion, it is difficult to capture every shooting image stably when the user manually tracks the object. When the user is in a bumpy and unstable state, the shooting device at the handheld gimbal cannot be always pointed at the object. In addition, when the user uses an extension stick, it is difficult for the user to see the shooting image on a display screen of the shooting device, thereby the user cannot complete composition of the image. Especially, when the user takes a selfie, it is difficult to achieve an expected shooting effect with the existing handheld gimbal.

If the user needs to observe the shooting image in real time, an additional terminal (such as a mobile phone) that is compatible with the handheld gimbal is required. During the shooting, the handheld gimbal will send the shooting image to the terminal, and the user needs to observe the shooting image in real time on a terminal application (APP), which is cumbersome and inconvenient.

SUMMARY

In accordance with the disclosure, there is provided a shooting control method including determining a handheld gimbal is in a selfie mode, determining characteristic information of a target object, controlling a shooting device of the handheld gimbal to track and shoot the target object according to the characteristic information of the target object, determining position information of the target object in a shooting image according to the characteristic information of the target object, adjusting a control parameter of the shooting device according to the position information of the target object in the shooting image, to enable the shooting device to shoot the target object in a preset configuration to obtain the shooting image, and displaying the shooting image in real time on a display screen of the handheld gimbal.

Also in accordance with the disclosure, there is provided a handheld gimbal including a handle, a gimbal fixedly connected to the handle, a shooting device mounted at the gimbal and used to shoot images, a display screen provided at the handle, and a controller electrically connected to the gimbal, the shooting device, and the display screen, and used to receive images shot by the shooting device and, according to the received image, determine the handheld gimbal is in a selfie mode, determine characteristic information of a target object, control the shooting device to track and shoot the target object according to the characteristic information of the target object, determine position information of the target object in a shooting image according to the characteristic information of the target object, adjust a control parameter of the shooting device according to the position information of the target object in the shooting image, to enable the shooting device to shoot the target object in a preset configuration to obtain the shooting image, and control the display screen to display the shooting image in real time.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

A handheld gimbal and a shooting control method for the handheld gimbal will be described in detail below with reference to the drawings. When there is no conflict, the following embodiments and features of the embodiments can be combined with each other.

The handheld gimbal consistent with the embodiments of the present disclosure includes a shooting device and a display screen. The shooting device may be an integrated shooting device, such as a camera or a mobile phone, or may include an optical lens and an image sensor. The handheld gimbal also includes a handle and a gimbal, and the shooting device is mounted at the handle via the gimbal. The gimbal may be a two-axis gimbal or a three-axis gimbal. The gimbal can at least rotate around a yaw axis to drive the shooting device to rotate in a yaw direction.

In some embodiments, the display screen is a part of the handheld gimbal rather than being set separately. Specifically, the display screen is provided at the handle. The display screen can include an LCD liquid crystal display screen or another type of display screen. A size of the display screen may include a small size, such as a 3×3 cm$^2$, or may include another size, which is not limited here.

In addition, the handheld gimbal also includes a controller, which can execute the shooting control method consistent with the embodiments of the present disclosure.

Figure 1:
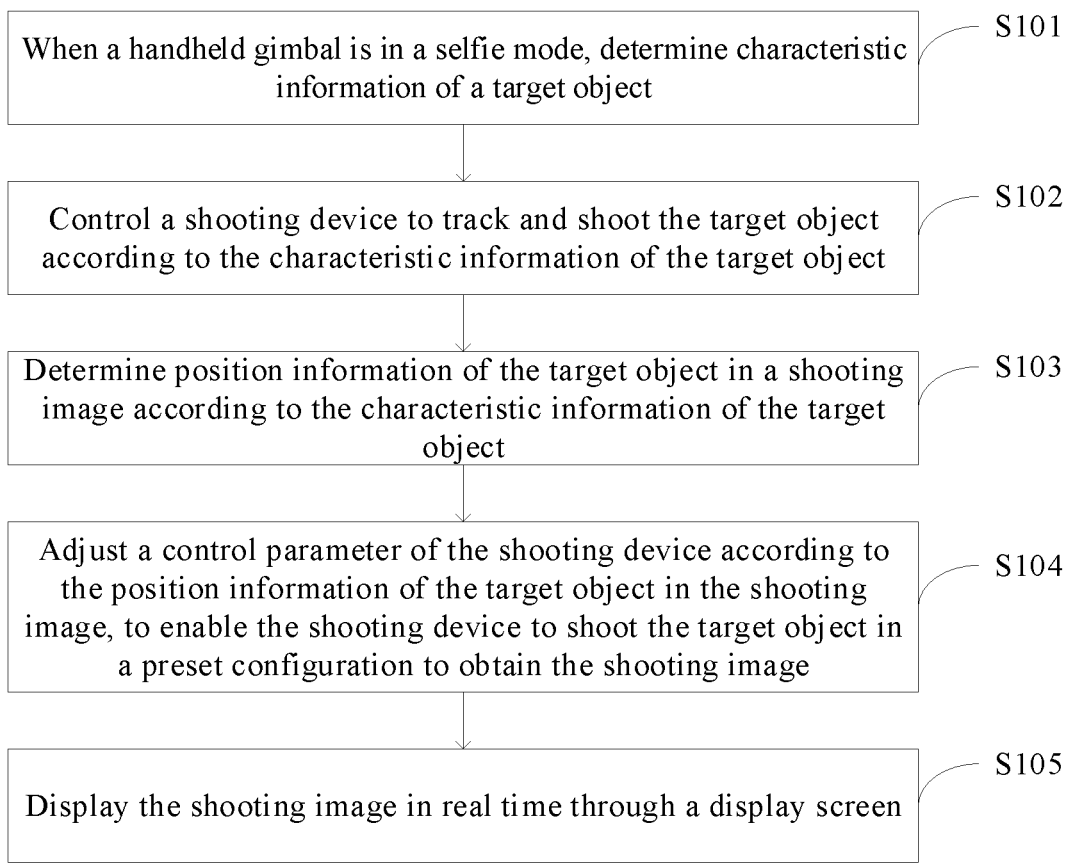
FIG. 1 is a schematic flow chart of a shooting control method for a handheld gimbal according to an example embodiment of the present disclosure.

FIG. 1 is a schematic flow chart of the shooting control method for a handheld gimbal according to an example embodiment of the present disclosure. As shown in FIG. 1, the shooting control method for a handheld gimbal according to an example embodiment of the present disclosure includes following processes.

At S101, when the handheld gimbal is in a selfie mode, characteristic information of the target object is determined.

In an example embodiment, the handheld gimbal may have a plurality of shooting modes, such as a single shooting mode, a continuous shooting mode, a panoramic mode, a scene (such as portrait, landscape, sports, etc.) mode, etc. The handheld gimbal may also have a normal shooting mode and the selfie mode. In some embodiments, the selfie mode refers to a tracking selfie mode rather than a single-shot selfie.

By default, when the handheld gimbal is turned on, the handheld gimbal is in the mode same as that when the handheld gimbal was last turned off. In some embodiments, the handheld gimbal was in the selfie mode when the handheld gimbal was turned off last time, and the controller can detect that the handheld gimbal is in the selfie mode after the handheld gimbal is currently turned on.

In some embodiments, the handheld gimbal was in the normal shooting mode when the handheld gimbal was last turned off, and the handheld gimbal is in the normal shooting mode after the handheld gimbal is currently turned on. After the handheld gimbal is currently turned on, if a user needs to take a selfie, the handheld gimbal needs to be triggered to be in the selfie mode. In an example embodiment, before process S101, it is required to determine that the handheld gimbal is triggered to be in the selfie mode.

Specifically, the handheld gimbal can be switched from the normal shooting mode to the selfie mode using automatic triggering or manual triggering, which is described below.

In some embodiments, the handheld gimbal is switched from the normal shooting mode to the selfie mode using the automatic triggering. Specifically, the controller obtains a preview image shot by the shooting device, determines that a specific target object exists in the preview image according to a target detection algorithm, and then switches the handheld gimbal from the normal shooting mode to the selfie mode. In this implementation manner, after obtaining the preview image shot by the shooting device, if the controller determines that there is a specific target object in the preview image according to the target detection algorithm, then the controller determines that the handheld gimbal is triggered to be in the selfie mode.

The specific target object can include a person, a car, a boat, etc. In a feasible implementation manner, the controller can detect the target object in the preview image through a neural network model. For example, when determining the characteristic information of the target object, the controller detects the position and size of the target object in the preview image through the neural network model.

In another feasible implementation manner, the controller can detect the target object in the preview image through a face detection algorithm or a target contour detection algorithm. When determining the characteristic information of the target object, the controller extracts face characteristic information of the target object in the preview image according to the face detection algorithm, or extracts contour characteristic information of the target object in the preview image according to the target contour detection algorithm.

In the above implementation manners, the target object in the preview image can include one or more target objects.

In some embodiments, the handheld gimbal is switched from the normal shooting mode to the selfie mode using the manual triggering. Specifically, the controller obtains the preview image shot by the shooting device and controls to display the preview image on the display screen. If the controller obtains a tracking trigger operation performed by the user on the display screen for the preview image, the controller switches the handheld gimbal from the normal shooting mode to the selfie mode. In an example embodiment, after the controller obtains the preview image shot by the shooting device and controls to display the preview image on the display screen, if the controller obtains a tracking trigger operation performed by the user on the display screen for the preview image, then the controller determines that the handheld gimbal is triggered to be in the selfie mode.

The tracking trigger operation obtained by the controller may include a click operation, a frame selection operation, both the click operation and the frame selection operation, or another operation. The click operation may include one or more of a one-click operation, a double-click operation, and a long-press operation obtained through the display screen, or one or more of a single-click operation, a double-click operation, and a long-press operation obtained through an application (APP) on the display screen. The frame selection operation may include a frame selection operation obtained on the display screen, or a frame selection operation obtained through an APP on the display screen.

Further, when determining the characteristic information of the target object, the controller determines the characteristic information of the target object in the preview image shot by the shooting device according to the obtained tracking trigger operation performed by the user on the preview image on the display screen.

In an example embodiment, the controller may obtain a click operation performed by the user on the display screen for the preview image and determine a clicked image area according to the click operation, thereby obtaining the characteristic information used to describe the target object in the clicked image area according to the clicked image area. The characteristic information of the target object includes one or more of a length, a width, and coordinate information of the clicked image area determined by the click operation. The click operation may include a single-click operation, a double-click operation, or a long-press operation.

Figure 2A:
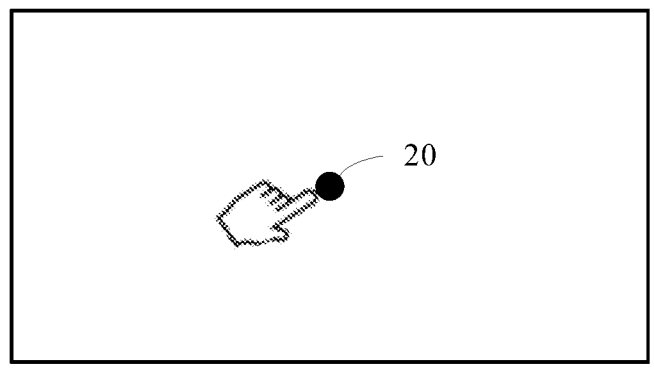
FIG. 2A is a schematic interface diagram showing a click operation performed by a user on a display screen for a preview image according to an example embodiment of the present disclosure.
Figure 2B:
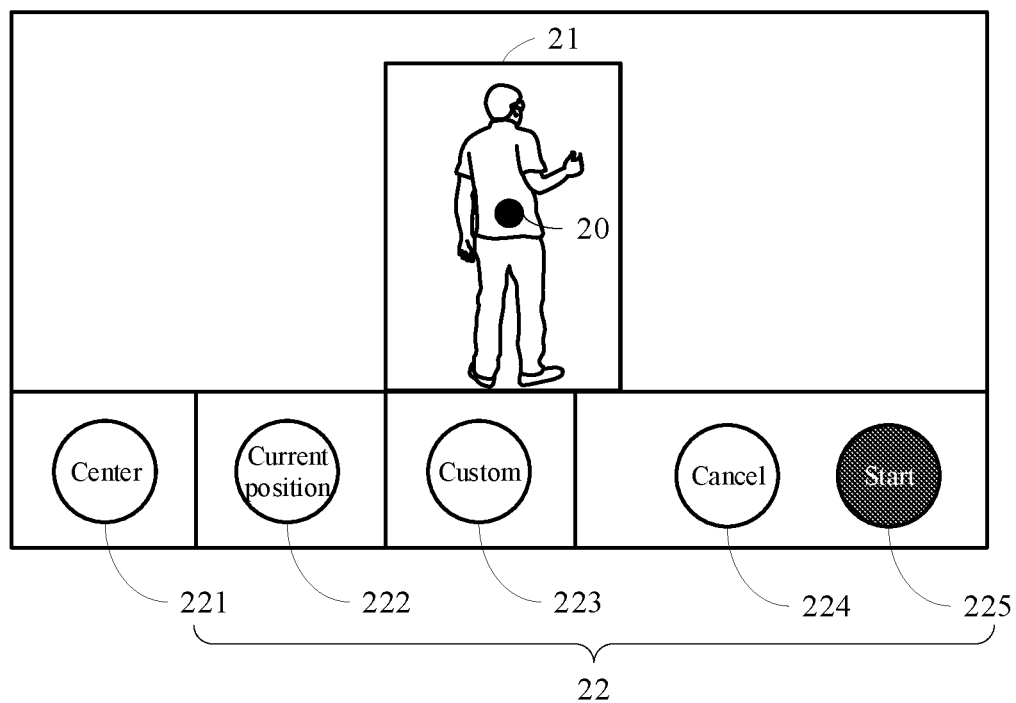
FIG. 2B is a schematic interface diagram showing obtaining a target object from the preview image consistent with the embodiments of the present disclosure.

FIGS. 2A and 2B can be used as examples for illustration. FIG. 2A is a schematic diagram showing an interface of a click operation performed by a user on a display screen for a preview image according to an example embodiment of the present disclosure. FIG. 2B is a schematic diagram showing the interface of obtaining a target object from the preview image consistent with the embodiments of the present disclosure. The interface shown in FIG. 2A includes the preview image shot by the shooting device and displayed on the display screen. The controller can automatically determine a clicked image area 21 shown in FIG. 2B through the click operation performed by the user on a point 20 on the display screen shown in FIG. 2A. The controller can use an image in the clicked image area 21 as the target object, and obtain the characteristic information used to describe the target object in the clicked image area 21 according to the clicked image area 21, i.e., the length, width, coordinate information, etc., of the clicked image area 21 shown in FIG. 2B. When the clicked image area 21 is determined, a menu 22 is also displayed on the display screen. The menu 22 includes options for indicating display position information, such as a center option 221, a current position option 222, a custom option 223, a cancel option 224, and a start option 225. If the click operation on the point 20 on the display screen shown in FIG. 2A includes a single click operation, the controller can obtain the clicked image area 21 shown in FIG. 2B determined by the click operation, obtain the characteristic information, such as the length, width, coordinate information, etc., of the clicked image area 21, and determine the object in the clicked image area 21 as the target object.

In some embodiments, when the clicked image area is determined, only a preview image but no menu may be displayed on the display screen. FIG. 2A can be used as an example for illustration. If the click operation on the point 20 on the display screen shown in FIG. 2A includes a long-press operation, the handheld gimbal is triggered to activate the selfie mode. That is, after the user long-presses the point 20 for a certain time, the controller determines that the user activates the tracking selfie mode and obtains the clicked image area 21 determined by the long-press operation on the point 20.

In an example embodiment, the controller may determine a target point by obtaining a click operation, perform object estimation and detection on the preview image with the target point as a center, determine the target object, and determine the clicked image area according to the target object, thereby obtaining the characteristic information used to describe the target object in the clicked image area according to the clicked image area.

In a specific implementation process, the controller can determine a coordinate position of the target point according to the obtained click operation, and detect whether there is an object on the preview image with the target point as the center using a preset detection algorithm. If the controller detects that there is an object on the preview image, the controller determines the target object and determines the clicked image area according to the target object, thereby determining the characteristic information, such as the length, width, coordinate information, etc., of the clicked image area of the target object. The preset detection algorithm may include one or more detection algorithms used to determine the target object, which are not limited here. For example, assuming that the preset detection algorithm includes a saliency algorithm, the controller can obtain the size and position information of an object with a highest saliency including the coordinate information of the target point through the saliency algorithm, and determine the object as the target object.

In an example embodiment, the controller may obtain the target point determined by the click operation, take the target point as the center to perform an image enlargement operation on the preview image according to a preset ratio, and obtain a frame-selected image area of the enlarged preview image determined by a frame selection operation. Then the controller may obtain the characteristic information used to describe the target object in the frame-selected image area according to the frame-selected image area. In a specific implementation process, if the click operation obtained by the controller is a click operation, the controller can obtain the target point determined by the click operation of the user on the display screen, take the target point as the center to obtain the image after the preview image is enlarged by the user on the display screen according to a preset ratio. The user can perform a frame selection operation on the enlarged preview image. The controller can obtain the frame-selected image area determined by the frame selection operation of the user, and determine the characteristic information used to describe the length, width, coordinate information, etc., of the frame-selected image area.

Figure 2C:
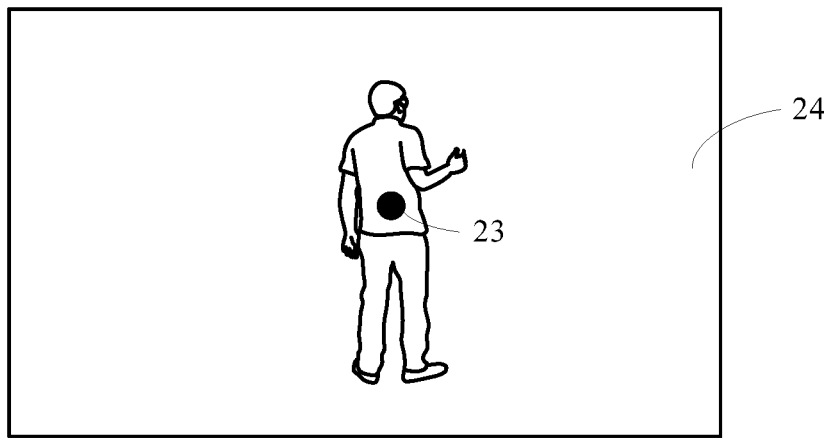
FIG. 2C is a schematic interface diagram showing an enlargement operation on the display screen consistent with the embodiments of the present disclosure.
Figure 2D:
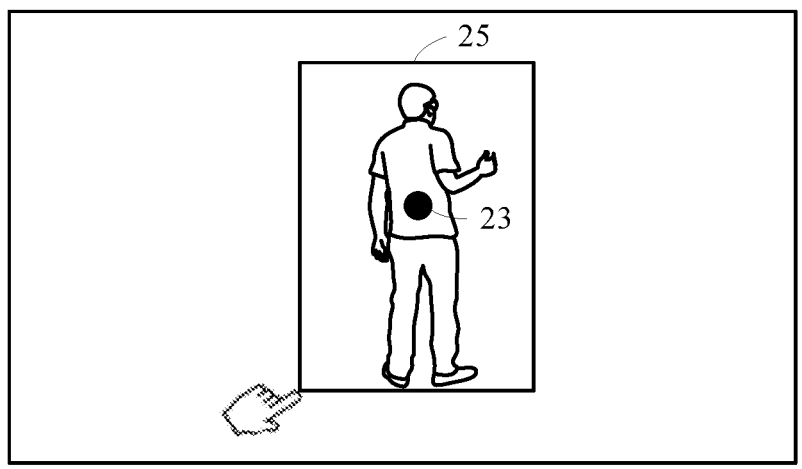
FIG. 2D is a schematic interface diagram showing a frame selection operation on the preview image after the enlargement operation consistent with the embodiments of the present disclosure.

Specifically, FIGS. 2C and 2D can be used as examples for illustration. FIG. 2C is a schematic diagram showing the interface of an enlargement operation on the display screen consistent with the embodiments of the present disclosure. FIG. 2D is a schematic diagram showing the interface of a frame selection operation on the preview image after the enlargement operation consistent with the embodiments of the present disclosure. If the click operation obtained by the controller is a click operation on a target point 23 shown in FIG. 2C, the controller can obtain the coordinate information of the target point 23 determined by the click operation of the user on the display screen. The controller then can use the target point 23 as the center to obtain an image 24 after the user performs the enlargement operation on the preview image on the display screen according to a preset ratio. The user can perform a frame selection operation on the enlarged preview image 24 as shown in FIG. 2D. The controller can obtain a frame-selected image area 25 determined by the frame selection operation of the user, and determine the characteristic information used to describe the length, width, coordinate information, etc., of the frame-selected image area 25.

In an example embodiment, the controller can obtain the frame selection operation performed by the user on the preview image on the display screen, determine the frame-selected image area according to the frame selection operation, and obtain the characteristic information used to describe the target object in the frame-selected image area according to the frame-selected image area. The controller can obtain the frame selection operation on the display screen, determine the frame-selected image area according to the frame selection operation, and obtain the characteristic information, for example, the length, width, and coordinate information, used to describe the target object in the frame-selected image area by calculation.

Figure 3A:
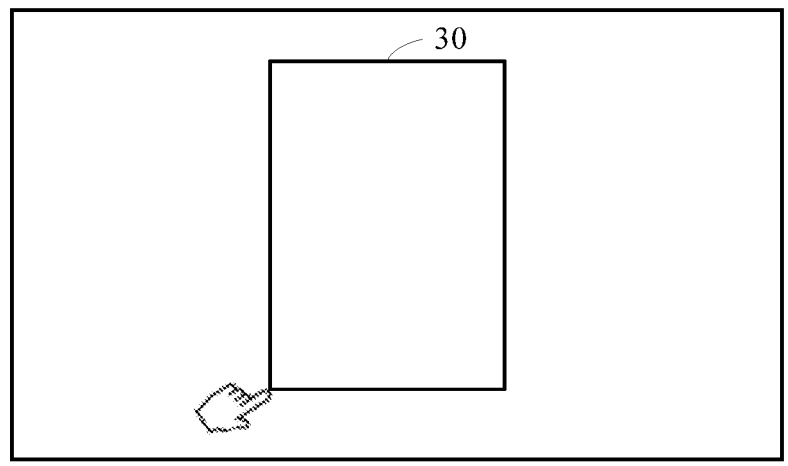
FIG. 3A is a schematic interface diagram showing the frame selection operation performed by the user on the display screen for the preview image consistent with the embodiments of the present disclosure.
Figure 3B:
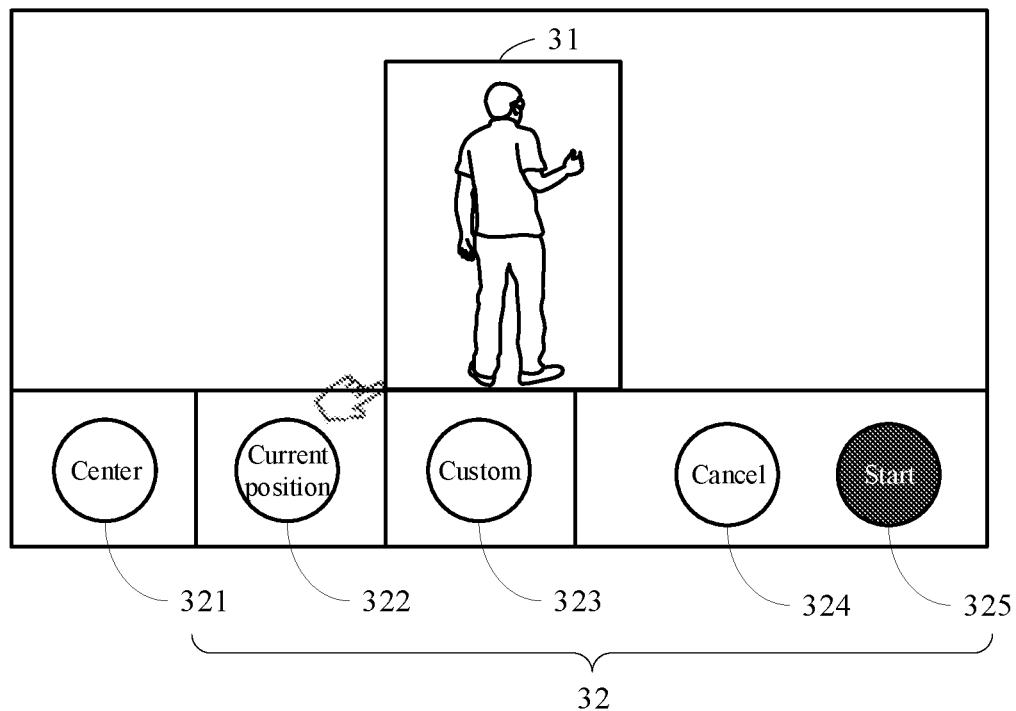
FIG. 3B is another schematic interface diagram showing obtaining the target object from the preview image consistent with the embodiments of the present disclosure.

Specifically, FIGS. 3A and 3B can be used as examples for illustration. FIG. 3A is a schematic diagram showing the interface of the frame selection operation performed by the user on the display screen for the preview image consistent with the embodiments of the present disclosure. FIG. 3B is another schematic diagram showing the interface of obtaining the target object from the preview image consistent with the embodiments of the present disclosure. The interface shown in FIG. 3A is a preview image shot by the shooting device and displayed on the display screen. The user can perform the frame selection operation on the preview image shown in FIG. 3A to select an area 30, determine a frame-selected image area 31 as shown in FIG. 3B. Then the user can set an image in the frame selection image area 31 as the target object, and obtain the characteristic information used to describe the target object in the frame-selected image area 31, that is, the length, width, coordinate information, etc. of the frame-selected image area 31 as shown in FIG. 3B.

In an example embodiment, when the controller switches the handheld gimbal from the normal shooting mode to the selfie mode, the controller not only needs to meet a trigger condition corresponding to the above-described automatic triggering or manual triggering, but also needs to meet another condition. For example, in an example embodiment, the controller switching the handheld gimbal from the normal shooting mode to the selfie mode further includes the controller detecting a selection operation performed by the user to switch the shooting device to face the user to shoot. In some embodiments, when the controller detects that the handheld gimbal meets the trigger condition corresponding to the automatic triggering and detects the selection operation of the user to switch the shooting device to face the user to shoot, the controller determines that the handheld gimbal is triggered to be in the selfie mode. In some embodiments, when the controller detects that the handheld gimbal meets the trigger condition corresponding to the manual triggering and detects the selection operation of the user to switch the shooting device to face the user to shoot, the controller determines that the handheld gimbal is triggered to be in the selfie mode.

Before the controller detects the selection operation of the user to switch the shooting device to shoot the user, the controller detects the selection operation of the shooting mode of the handheld gimbal by the user and determines the shooting mode of the handheld gimbal according to the selection operation. Specifically, a key or button may be provided on the handheld gimbal to enable the user to set the shooting mode of the handheld gimbal by operating the key or button. For example, when the shooting device is a lens mounted at the handheld gimbal, the key or button can be used to control the rotation of at least one axis of the handheld gimbal to cause the lens to rotate towards the user in the yaw direction, thereby switching the shooting device to face the user to shoot. For another example, when the shooting device is a mobile phone mounted at the handheld gimbal, the key or button can be used to control the shooting device to switch to a front camera or switch to a rear camera. Accordingly, the controller detects an operation performed by the user on the key or button and determines the shooting mode of the handheld gimbal according to the operation. For example, when the user single-clicks the key or button, the shooting device is switched to face the user to shoot. Correspondingly, the controller detects the single-click operation of the user to switch the shooting device to the front camera. When the user double-clicks the key or button, the shooting device is switched to the normal shooting mode. Correspondingly, the controller detects the double-click operation of the user to switch the shooting device to the normal shooting mode. The key or button can include a physical key or physical button provided on the handle, or a virtual key or virtual button provided on the display screen.

The controller detecting the selection operation of the shooting mode of the handheld gimbal performed by the user includes detecting the selection operation performed by the user to rotate the shooting device with the yaw axis as the rotation axis to face the user. For example, the key or button may be provided at the handheld gimbal, and the key or button is used to control the rotation of the shooting device with the yaw axis as the rotation axis. When the user needs to take a selfie, the user can click or long-press the key or button. During the clicking or long pressing, the shooting device can continue to rotate with the yaw axis as the rotation axis. When the shooting device rotates to a direction facing the user with the yaw axis as the rotation axis, the user can stop clicking or pressing the key or button. Correspondingly, the controller can detect the click operation or long-press operation of the user on the key or button. When the user clicks or long-presses the key or button, the controller detects a rotation angle of the shooting device with the yaw axis as the rotation axis in real time. When the shooting device rotates to the direction facing the user with the yaw axis as the rotation axis, the controller determines that the shooting device is in the selfie mode.

In another embodiment, the controller switching the handheld gimbal from the normal shooting mode to the selfie mode further includes the controller detecting that a difference between the rotation angle of the handheld gimbal with the yaw axis as the rotation axis and 180 degrees is less than a first angle threshold, and an angle between the yaw axis of the handheld gimbal and the vertical direction is less than a second angle threshold. In some embodiments, when the controller detects that the handheld gimbal meets the trigger condition corresponding to the automatic triggering, and detects that the difference between the rotation angle of the handheld gimbal with the yaw axis as the rotation axis and 180 degrees is less than the first angle threshold, and the angle between the yaw axis of the handheld gimbal and the vertical direction is less than the second angle threshold, the controller determines that the handheld gimbal is triggered to be in the selfie mode. In some embodiments, when the controller detects that the handheld gimbal meets the trigger conditions corresponding to the manual triggering, and detects that the difference between the rotation angle of the handheld gimbal with the yaw axis as the rotation axis and 180 degrees is less than the first angle threshold, and the angle between the yaw axis of the handheld gimbal and the vertical direction is less than the second angle threshold, the controller determines that the handheld gimbal is triggered to be in the selfie mode.

For example, a yaw angle of the handheld gimbal at a current moment is 0 degree. Starting from the current moment, the user rotates the handheld gimbal to enable the handheld gimbal to rotate with the yaw axis as the rotation axis, thereby constantly changing the yaw angle of the handheld gimbal. When the controller detects that the rotation angle of the handheld gimbal with the yaw axis as the rotation axis is closed to 180 degrees, and the yaw axis of the handheld gimbal remains approximately vertical, the controller determines the handheld gimbal is in the selfie mode. In some embodiments, the controller may only detect an attitude change of the handle of the handheld gimbal and determine the handheld gimbal enters the selfie mode according to the attitude change of the handle. For example, in some cases, when the handheld gimbal is in a stabilization mode for normal shooting, the user rotates the handle about 180 degrees, indicating that the user wants to use the handheld gimbal to take a selfie, even if the axis of the gimbal remains in the stabilization mode currently, the controller can determine that the handheld gimbal enters the selfie mode by detecting the attitude change of the handle.

In an example embodiment, when the handheld gimbal is in the normal shooting mode, the orientation of the lens of the shooting device is opposite to the orientation of the display screen of the handheld gimbal. In this scenario, the handheld gimbal is in a non-selfie mode by default. After the handheld gimbal is determined to enter the selfie mode by the manual triggering or automatic triggering, the lens of the shooting device is rotated to be consistent with the orientation of the display screen. In this scenario, both the lens of the shooting device and the display screen face the user. When the user takes a selfie, the user can view a posture and picture composition on the display screen in real time, which is convenient for the user to adjust in real time to complete a more satisfactory selfie.

In an example embodiment, before the controller detects the selection operation performed by the user to switch the shooting device to face the user to shoot, the controller also detects the attitude of the handheld gimbal and determines the shooting mode of the handheld gimbal according to the attitude of the handheld gimbal. Specifically, the controller can detect the attitude of the handheld gimbal in real time and determine the shooting mode of the handheld gimbal according to the attitude of the handheld gimbal. For example, the handheld gimbal includes a three-axis gimbal. The three-axis gimbal can rotate in the directions of pitch axis, yaw axis, and roll axis. The controller can detect the rotation angle of the three-axis gimbal in the directions of the pitch axis, yaw axis, and roll axis. The controller can determine the attitude of the handheld gimbal according to the rotation angle, and further determine whether the handheld gimbal enters the selfie mode according to the attitude of the handheld gimbal.

Refer again to FIG. 1, at S102, the shooting device is controlled to track the target object according to the characteristic information of the target object.

Specifically, when the controller executes process S102, according to the characteristic information of the target object, a tracking algorithm is used to control the shooting device to track the target object. The tracking algorithm can include a Kanade-Lucas-Tomasi (KLT) feature tracking algorithm or another tracking algorithm.

At S103, the position information of the target object in the shooting image is determined according to the characteristic information of the target object.

Figure 4A:
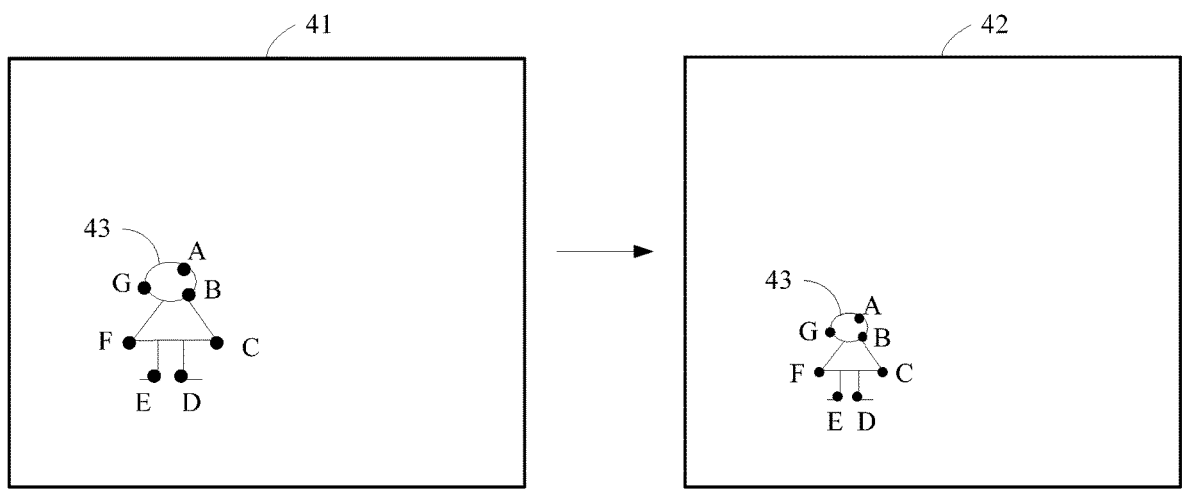
FIG. 4A is a schematic diagram showing a shooting image output by a shooting device consistent with the embodiments of the present disclosure.

As shown in FIG. 4A, 41 and 42 represent two frames of images output successively by the shooting device, respectively. When the shooting device outputs the image 41, the controller detects a target object 43 through a neural network model, and determines feature points, such as A, B, C, D, E, F, and G, of the target object 43 according to a feature point detection algorithm. Further, the controller may specifically use the KLT feature tracking algorithm to track the target object 43. For example, the controller determines the positions of the feature points A, B, C, D, E, F, and G of the image 41 in the image 42 according to the KLT feature tracking algorithm. Then the controller determines the position of the target object 43 in the image 42 according to the positions of the feature points A, B, C, D, E, F, and G in the image 42. In some embodiments, the controller may also determine the position of the target object 43 in the image after the image 42 to realize the tracking of the target object 43.

Refer again to FIG. 1, at S104, a control parameter of the shooting device is adjusted according to the position information of the target object in the shooting image, to enable the shooting device to shoot the target object in a preset configuration to obtain the shooting image.

At S105, the shooting image is displayed in real time on the display screen.

In some embodiments, the preset configuration includes at least one of a preset position of the target object in the shooting image of the shooting device, or a preset size of the target object in the shooting image of the shooting device.

For example, the target object can be moving or stationary relative to the handheld gimbal. If the position of the target object in the shooting image is not the preset position, the controller can adjust the control parameter of the shooting device according to the position information of the target object in the shooting image, to cause the target object to remain at the preset position in the shooting image of the shooting device. In some embodiments, the control parameter of the shooting device may include at least one of a focal length, shutter, aperture, and a shooting attitude. When the control parameter includes the shooting attitude, adjusting the control parameter of the shooting device includes adjusting the attitude of the shooting device along the pitch, yaw, and roll axes.

Alternatively, the target object may be moving relative to the handheld gimbal, the size of the target object in the shooting image changes with time. When the size of the target object in the shooting image is not the preset size, the shooting parameter of the shooting device can be adjusted, for example, the shooting device can be controlled to zoom to cause the target object to maintain the preset size in the shooting image of the shooting device.

In an example embodiment, before the controller controls the shooting device to track and shoot the target object according to the characteristic information of the target object, the controller also needs to obtain a preview image shot by the shooting device and control to display the preview image on the display screen.

In an example embodiment, the preset position includes a default position. For example, the preset position may include the position of the target object in the preview image.

In another example embodiment, the preset position is set by the user. After controlling to display the preview image on the display screen, the controller also obtains the display position information of the target object set at the display screen and sets the preset position as a display position corresponding to the display position information.

For example, the controller obtains the click operation on position indication information included in a menu set at the display screen, and determine the display position information of the target object according to the position indication information determined by the click operation. A setting manner of the display position information of the target object can include setting through a menu set at the display screen, and the menu includes a plurality of position indication information options. The handheld gimbal can determine the display position information of the target object according to the obtained click operation performed by the user on the position indication information option.

In an example embodiment, the handheld gimbal can obtain the click operation on the position indication information option included in the menu set at the display screen, and determine the display position information of the target object according to the position indication information determined by the obtained click operation.

FIG. 2B can be used as an example for illustration. The handheld gimbal can obtain the click operation on the position indication information included in a menu 22 set at the display screen. If the user clicks a center option 221 in the menu 22, the handheld gimbal can determine that the display position information of the target object indicates a center position at the display screen according to obtained center position indication information determined by the click operation. If the user clicks a cancel option 224, the handheld gimbal can cancel the display position information set for the target object to the center position on the display screen for displaying the preview image. The user can reset the display position information of the target object. Specifically, the menu 22 can be operated by a single-click operation, a double-click operation, or a long-press operation to set selection position indication information. For another example, if the handheld gimbal obtains the click operation performed by the user on a current position option 222 in the menu 22, then the controller can obtain the position indication information of the current position option 222 determined by the click operation, and determine that the display position information of the target object indicates a current position of the target object on the display screen for displaying the preview image. Similarly, if the user clicks the cancel option 224, the handheld gimbal can cancel the display position information set for the target object to the current position on the display screen for displaying the preview image. The user can reset the display position information of the target object. In some embodiments, the display position information of the target object includes the obtained position indication information determined by the click operation. In some embodiments, the obtained position indication information determined by the click operation may be adjusted according to a preset rule. The display position information of the target object includes the position indication information adjusted according to the preset rule. For example, the display position information of the target object includes a product of the position indication information and a first preset coefficient.

The setting manner of the display position information of the target object can also include obtaining a drag operation of the clicked image area on the display screen and determining the position information of the clicked image area dragged by the drag operation as the display position information of the target object. In an example embodiment, the handheld gimbal may obtain the drag operation of the clicked image area, and determine the display position information of the target object according to the obtained position information of the clicked image area dragged by the drag operation. FIG. 2B is used as an example for illustration. If the controller obtains the click operation performed by the user on the custom option 223 in the menu 22, the user can drag the clicked image area 21 of the target object to any position on the display screen, and use the position of the clicked image area 21 dragged by the drag operation as the display position information of the target object. For another example, the handheld gimbal can directly drag the clicked image area 21 of the target object to any position without obtaining the click operation on the custom option 223 in the menu 22, and use the position of the clicked image area 21 dragged by the drag operation as the display position information of the target object. In some embodiments, the display position information of the target object includes the obtained position information of the clicked image area dragged by the drag operation. In some embodiments, the obtained position information of the clicked image area dragged by the drag operation can be adjusted according to the preset rule. The display position information of the target object includes the position information adjusted according to the preset rule. For example, the display position information of the target object includes a product of the position information of the clicked image area dragged by the drag operation and a second preset coefficient.

For another example, the controller can also obtain the frame selection operation performed by the user on the preview image on the display screen and determine the frame-selected image area according to the frame selection operation. The controller can also obtain the drag operation on the determined frame-selected image area and determine the display position information of the target object according to the obtained position information of the frame-selected image area dragged by the drag operation. FIG. 3B is used as an example for illustration. The user can directly drag the frame-selected image area 31 of the target object to any position, and use the position of the frame-selected image area 31 dragged by the drag operation as the display position information of the target object. In some embodiments, the display position information of the target object is the obtained position information of the framed image area dragged by the drag operation. In some embodiments, the obtained position information of the frame-selected image area dragged by the drag operation can be adjusted according to the preset rule. The display position information of the target object includes the position information adjusted according to the preset rule. For example, the display position information of the target object includes a product of the position information of the frame-selected image area dragged by the drag operation and a third preset coefficient.

In an example embodiment, the preset size includes a default size. For example, the preset size may include the size of the target object in the preview image.

In another example embodiment, after the controller controls to display the preview image shot by the shooting device on the display screen, the controller also obtains display size information of the target object set on the display screen, and the preset size includes a display size corresponding to the display size information.

For example, referring to FIG. 2D, the controller obtains the click operation performed by the user on the display screen for the preview image. After the clicked image area 25 is determined by the click operation, the user can manually adjust the size of a target frame of the clicked image area to realize enlargement or reduction of the clicked image area 25. The preset size is determined according to the size of the clicked image area manually adjusted by the user. In some embodiments, the preset size includes the size of the clicked image area manually adjusted by the user. In some embodiments, the size of the clicked image area manually adjusted by the user can be adjusted according to the preset rule. The preset size includes the size of the clicked image area adjusted according to the preset rule. For example, the preset size includes a product of the size of the clicked image area manually adjusted by the user and a fourth preset coefficient.

For another example, referring to FIG. 3B, the controller obtains the frame selection operation performed by the user on the display screen for the preview image, and determines the frame-selected image area 31 according to the frame selection operation. The user can manually adjust the size of target frame of the frame-selected image area to realize the enlargement or reduction of the frame-selected image area 31. The preset size is determined according to the size of the frame-selected image area manually adjusted by the user. In some embodiments, the preset size includes the size of the frame-selected image area manually adjusted by the user. In some embodiments, the size of the frame-selected image area manually adjusted by the user can be adjusted according to preset rule. The preset size includes the size of the frame-selected image area adjusted according to the preset rule. For example, the preset size includes a product of the size of the frame-selected image area manually adjusted by the user and the fourth preset coefficient.

During tracking and shooting, the position of the target object in different shooting images may be different. In this scenario, the controller can adjust the control parameter of the shooting device to keep the target object at the preset position of the shooting image of the shooting device.

Figure 4B:
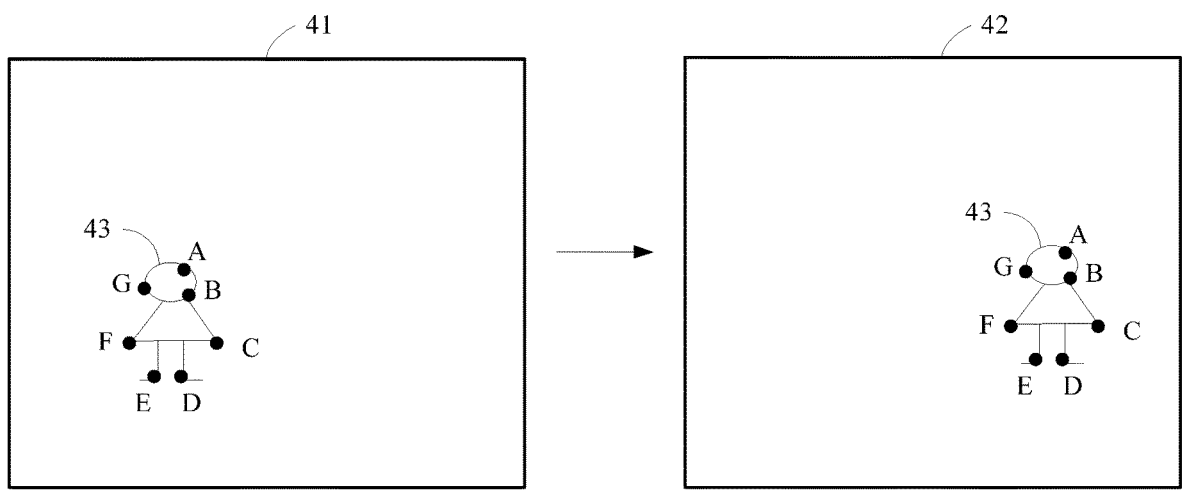
FIG. 4B is a schematic diagram showing another shooting image output by the shooting device consistent with the embodiments of the present disclosure.

In an example embodiment, the controller adjusts the shooting attitude of the shooting device according to the position information of the target object in the shooting image, to cause the target object to be at the preset position of the shooting image. As shown in FIG. 4B, the position of the target object 43 in the shooting image 41 is different from the position of the target object 43 in the shooting image 42. In this scenario, the controller can adjust the shooting attitude of the shooting device to cause the target object 43 to remain at the preset position of the shooting image. In some embodiments, the shooting attitude of the shooting device is adjusted by controlling the attitude of the gimbal.

Further, after the controller adjusts the shooting attitude of the shooting device by controlling the attitude of the gimbal, the controller also determines reliability of a target shooting image according to the characteristic information of the target object and tracking information of the target object determined in the target shooting image, and determines the attitude of the gimbal according to the reliability. The reliability is used to indicate tracking accuracy of the target shooting image obtained by the shooting device tracking and shooting the target object determined at the preview image. For example, the characteristic information obtained by the handheld gimbal at the preview image includes the length, width, and GPS coordinate position of the frame-selected image area. The controller determines the length, width, and GPS coordinate position, i.e., the tracking information, of the target object in the target shooting image. The controller can calculate the reliability of the target shooting image.

In an example embodiment, when the controller determines the attitude of the gimbal according to the reliability, the controller can detect whether the obtained reliability is less than a preset threshold. When the reliability is less than the preset threshold, the controller can perform a full image detection on the target shooting image. If there is a target object in the detection result, the controller can obtain detection position information of the target object in the target shooting image, and determine the attitude of the gimbal according to the detection position information and the position information corresponding to the preset position. For example, if the controller determines that the GPS coordinate position of the target shooting image is far from the GPS coordinate position of the frame-selected image area obtained on the preview image to cause the calculated reliability to be less than the preset threshold, the controller can perform a full image detection on the target shooting image. If the target object is detected in the full image, the controller can obtain the detection position information of the target object in the target shooting image and determine the attitude of the gimbal according to the detection position information and the display position information, to cause the characteristic information of the target object in the target shooting image to be same as the characteristic information of the target object set in the preview image.

In an example embodiment, when the controller determines the attitude of the gimbal according to the detection position information and the position information corresponding to the preset position, the controller specifically determines the rotation angle of the gimbal according to the detection position information and the position information of the preset position. In a specific implementation process, the controller can calculate the difference between the characteristic information of the target object in the target shooting image and the characteristic information of the target object set on the preview image according to the obtained detection position information and display position information of the target object in the target shooting image. The controller then determines the rotation angle of the gimbal according to the difference and controls the gimbal to rotate the rotation angle to enable the shooting device mounted at the gimbal to adjust the shooting angle according to the rotation of the gimbal, thereby causing the characteristic information of the target object in the target shooting image to be same as the characteristic information of the target object set on the preview image, and improving efficiency of the tracking and shooting.

In the embodiments of the present disclosure, the handheld gimbal obtains the tracking information on the target image to determine the reliability of the target shooting image. When the reliability is less than the preset threshold, the controller performs a full image detection on the target shooting image. If there is a target object in the detection result, the controller determines the rotation angle of the gimbal according to the detection position information and the display position information, to enable the shooting device mounted at the gimbal to adjust the shooting angle and shoot to obtain the target shooting image same as the characteristic information set on the preview image. In this way, the controller can detect and adjust the result of tracking and shooting, to improve the accuracy of tracking and shooting.

Figure 4C:
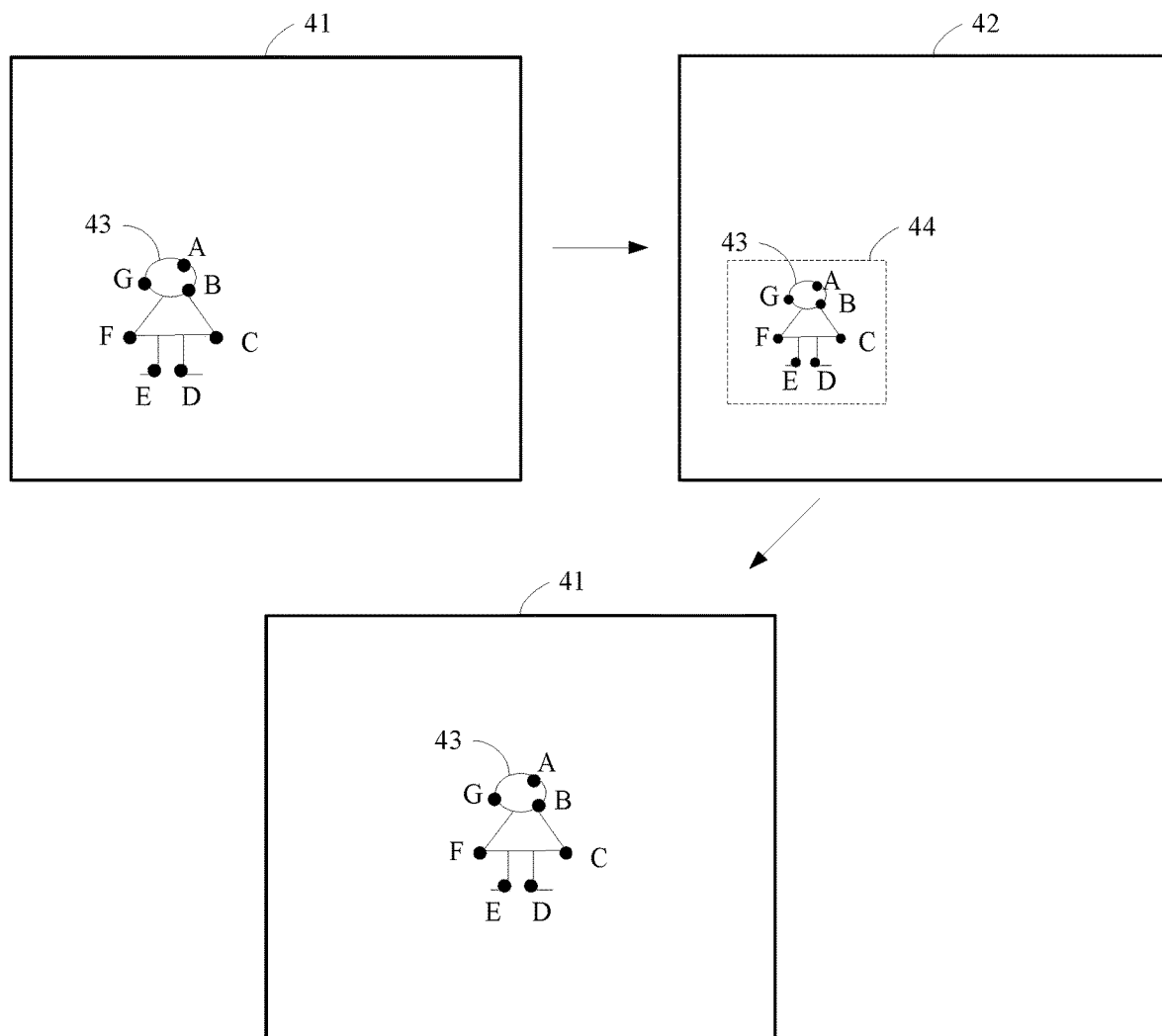
FIG. 4C is a schematic diagram showing another shooting image output by the shooting device consistent with the embodiments of the present disclosure.

In some embodiments, the method further includes cropping an area including the target object in the shooting image to cause the target object to be at the preset position of the shooting image. As shown in FIG. 4C, the target object 43 is relatively large in the shooting image 41 and relatively small in the shooting image 42. To enlarge the target object 43 in the shooting image 42 to a preset size, the controller may crop an area, such as the area 44 of the frame 42 including the target object 43, and enlarge the cropped area 44, thereby causing the size of the target object 43 in the shooting image to be same as the preset size, and keeping the target object 43 at the preset position of the shooting image, for example, keeping the target object 43 at the center of the shooting image.

In addition, during the tracking and shooting process, the size of the target object in different shooting images may be different. In this scenario, the controller can adjust the shooting parameter of the shooting device according to the position information of the target object in the shooting image, to keep the target object at the preset size in the shooting image. As shown in FIG. 4A, the size of the target object 43 varies in different shooting images. For example, the target object 43 is relatively large in the shooting image 41 and relatively small in the shooting image 42. When tracking the target object 43, the controller can control the shooting parameter of the shooting device to keep the target object 43 at the preset size in the shooting image of the shooting device.

In some embodiments, when the controller adjusts the shooting parameter of the shooting device according to the position information of the target object in the shooting image, to keep the target object at the preset size in the shooting image, the controller specifically controls the shooting device to zoom according to the position information of the target object in the shooting image, to keep the target object at the preset size in the shooting image. As shown in FIG. 4A, the target object 43 is relatively large in the shooting image 41 and relatively small in the shooting image 42. In this scenario, the controller may adjust the focal length of the shooting device to cause the sizes of the target object 43 in the shooting image 41 and the shooting image 42 to be the preset size.

In some embodiments, the method further includes cropping the area including the target object in the shooting image, to keep the target object at the preset size in the shooting image. As shown in FIG. 4C, the target object 43 is relatively large in the shooting image 41 and relatively small in the shooting image 42. The size of the target object 43 in the shooting image 42 is smaller than the preset size. To enlarge the target object 43 in the shooting image 42 to the preset size, the controller may crop the area, such as the area 44 of the frame 42 including the target object 43, and enlarge the cropped area 44, thereby causing the size of the target object 43 in the shooting image to be same as the preset size.

Figure 5:
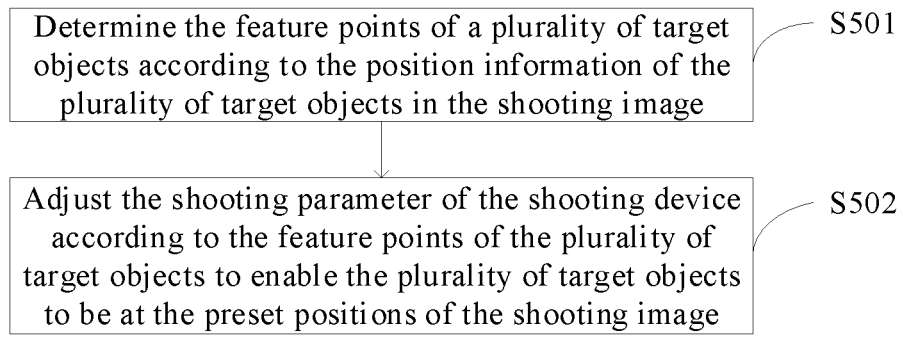
FIG. 5 is a schematic flow chart of a shooting control method for the handheld gimbal according to another example embodiment of the present disclosure.

FIG. 5 is a schematic flow chart of a shooting control method for the handheld gimbal according to another example embodiment of the present disclosure. As shown in FIG. 5, process S104 in the embodiments shown in FIG. 1 specifically includes the following processes.

At S501, the feature points of a plurality of target objects are determined according to the position information of the plurality of target objects in the shooting image.

At S502, the shooting parameter of the shooting device is adjusted according to the feature points of the plurality of target objects to enable the plurality of target objects to be at the preset positions of the shooting image.

Figure 6A:
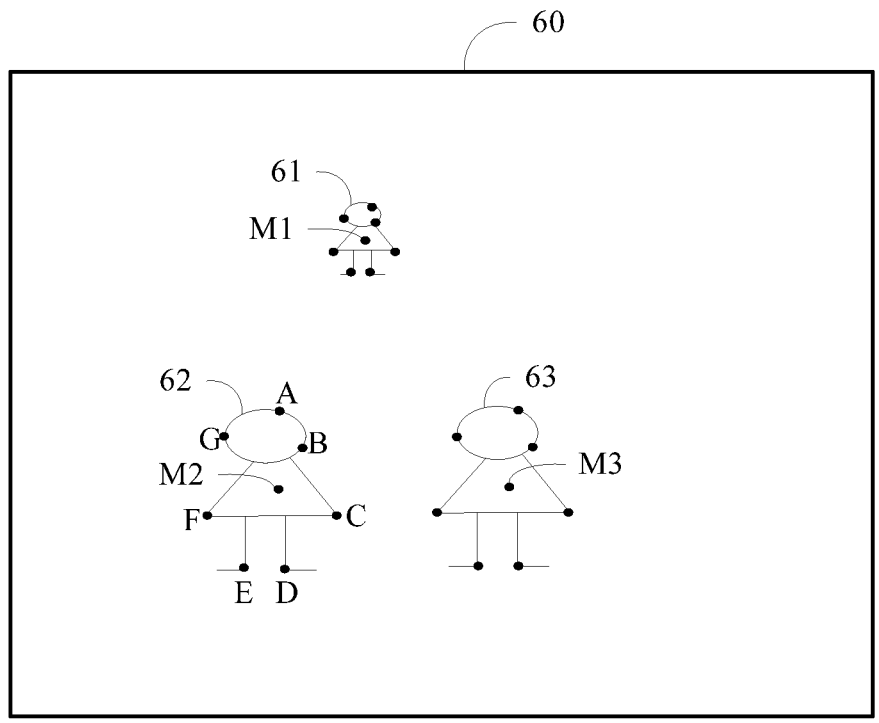
FIG. 6A is a schematic diagram showing another shooting image output by the shooting device consistent with the embodiments of the present disclosure.

As shown in FIG. 6A, the shooting image 60 output by the shooting device includes a plurality of target objects, such as the target object 61, the target object 62, and the target object 63. The controller detects the feature points of the plurality of target objects, respectively. For example, the feature points of the target object 61 detected are A, B, C, D, E, F, and G. The controller determines the position information of the center point M10 of the target object 61 in the shooting image 60 according to the position information of the feature points of the target object 61 in the shooting image 60. Similarly, the controller determines the position information of the center point M2 of the target object 62 in the shooting image 60, and the position information of the center point M3 of the target object 63 in the shooting image 60. The size of the target object 61, the target object 62, and the target object 63 in the shooting image 60 may be different. When calculating the center points of the target object 61, the target object 62, and the target object 63, respectively, the controller can weight the feature points of each target object to obtain the center point of each the target object in the shooting image according to the size of each target object in the shooting image.

The controller can control the shooting parameter of the shooting device, such as adjust the focal length of the shooting device and/or control the shooting attitude of the shooting device, according to the position information of the center point M1, the center point M2, and the center point M3 in the shooting image 60, to cause the target object 61, the target object 62, and the target object 63 to be maintained at the preset positions of the shooting image. In some embodiments, controlling the shooting parameter of the shooting device to keep the target object 61, the target object 62, and the target object 63 at the preset positions of the shooting image may include the following possible implementation manners.

Figure 6B:
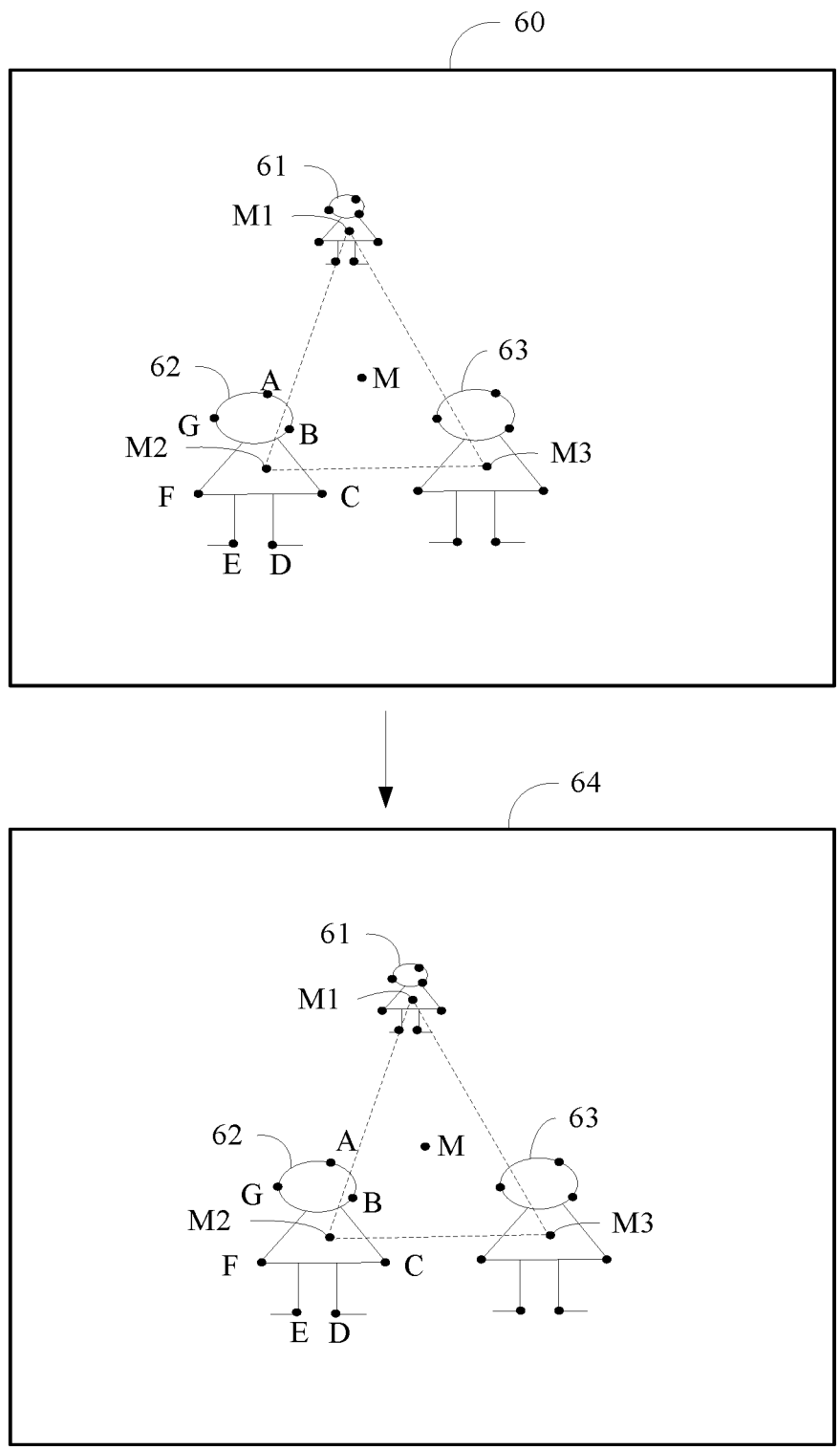
FIG. 6B is a schematic diagram showing another shooting image output by the shooting device consistent with the embodiments of the present disclosure.

A feasible implementation manner includes, as shown in FIG. 6B, according to the position information of the center point M1, the center point M2, and the center point M3 in the shooting image 60, determining the position information of the center point M of the center point M1, the center point M2, and the center point M3 in the shooting image 60. Further according to the position information of the center point M in the shooting image 60, the shooting parameter of the shooting device is controlled to cause the center point M to be maintained at the preset position of the shooting image. For example, the center point M is maintained at the center position of the shooting image 64. In some embodiments, the center point M of the center point M1, the center point M2, and the center point M3 may be the center point of a geometric figure formed by the center point M1, the center point M2, and the center point M3.

Figure 6C:
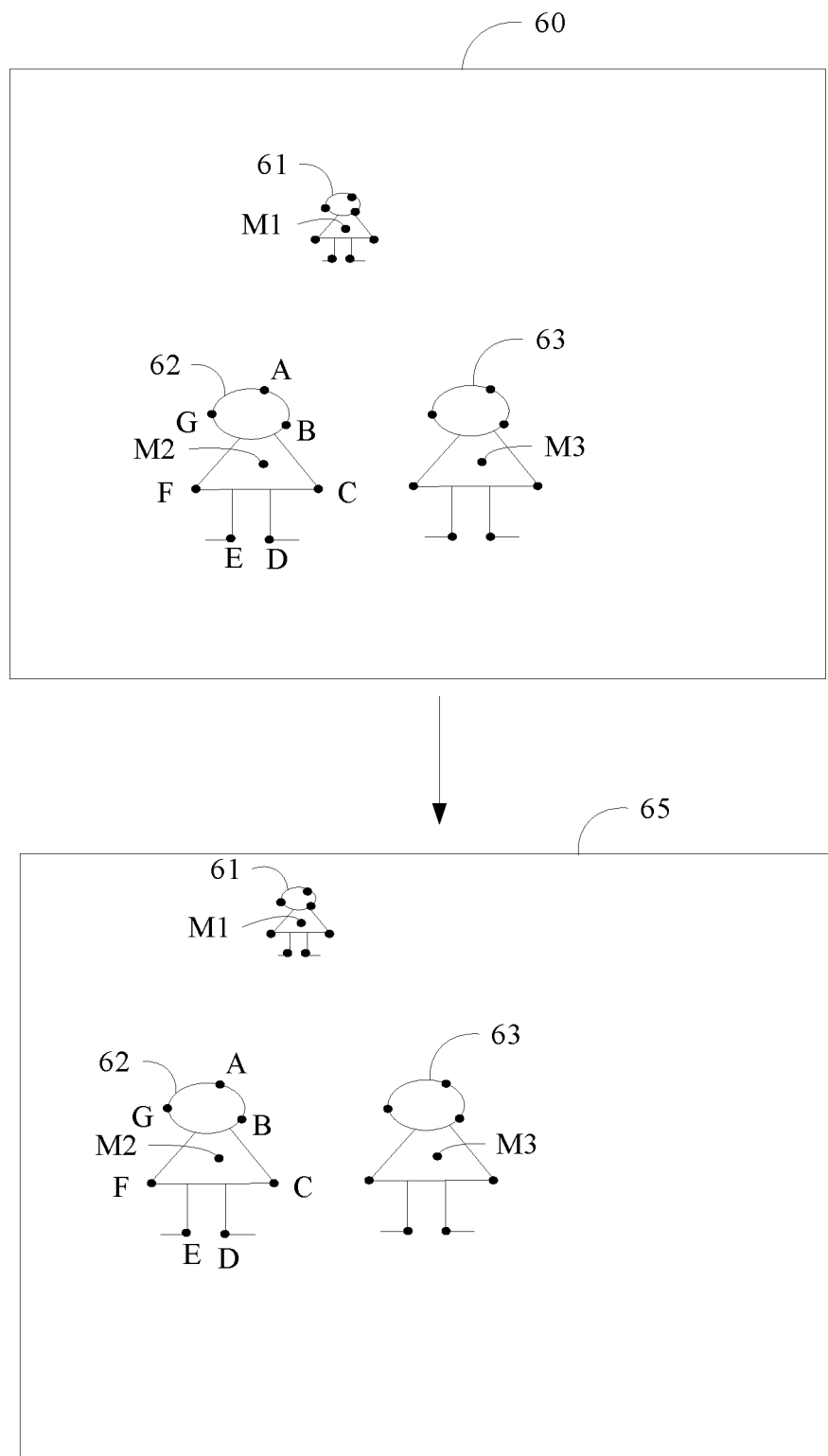
FIG. 6C is a schematic diagram showing another shooting image output by the shooting device consistent with the embodiments of the present disclosure.

In some embodiments, because the sizes of the target object 61, the target object 62, and the target object 63 in the shooting image 60 may be different. When calculating the position information of the center point M in the shooting image 60, the position information of the center point M1, the center point M2, and the center point M3 is weighted and calculated according to the sizes of the target objects in the shooting image to obtain the position information of the center point M in the shooting image 60. Another feasible implementation manner includes, as shown in FIG. 6C, according to the position information of the center point M1, the center point M2, and the center point M3 in the shooting image 60, controlling the shooting parameter of the shooting device to cause at least one of the center point M1, the center point M2, or the center points M3 to be maintained at the preset position of the shooting image. For example, the center point M2 is maintained at the center position of the shooting image 65.

Controlling the shooting parameter of the shooting device to cause the plurality of target objects to be maintained at the preset positions of the shooting image according to the center points of the plurality of target objects is only one of the feasible implementation manners. In other embodiments, the shooting parameter of the shooting device can be controlled according to another characteristic points of the plurality of target objects to cause the plurality of target objects to be maintained at the preset positions of the shooting image, which is not limited here.

In an example embodiment, the specific method and principle of controlling the control parameter of the shooting device are consistent with the above-described embodiments, which are omitted here.

In an example embodiment, the center points of the plurality of target objects are determined according to the position information of the plurality of target objects in the shooting image. The shooting parameter of the shooting device is controlled according to the center points of the plurality of target objects to cause the center points to be at the preset positions of the shooting image of the shooting device, thereby realizing the picture composition of the plurality of target objects by the handheld gimbal in the selfie mode.

Figure 7:
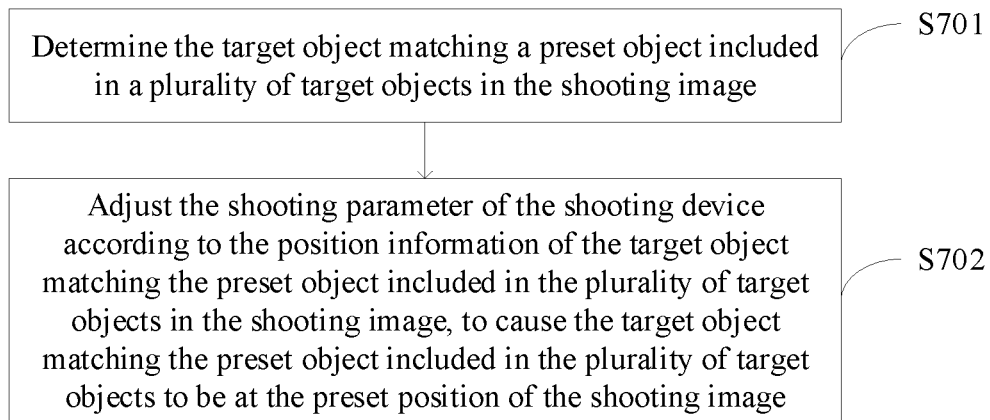
FIG. 7 is a schematic flow chart of a shooting control method for the handheld gimbal according to another example embodiment of the present disclosure.

FIG. 7 is a schematic flow chart of a shooting control method for the handheld gimbal according to another example embodiment of the present disclosure. As shown in FIG. 7, process S104 in the embodiments shown in FIG. 1 specifically includes the following processes.

At S701, the target object matching a preset object included in the plurality of target objects in the shooting image is determined.

At S702, the shooting parameter of the shooting device is adjusted according to the position information of the target object matching the preset object included in the plurality of target objects in the shooting image, to cause the target object matching the preset object included in the plurality of target objects to be at the preset position of the shooting image.

In an example embodiment, the handheld gimbal may be pre-stored with image information or feature point information of the preset object. The preset object may specifically include the user of the handheld gimbal. When the controller detects a plurality of target objects in the image output by the shooting device, the controller can compare the image information of each of the plurality of target objects with the image information of the preset object to determine the target object matching the preset object included in the plurality of target objects.

As shown in FIG. 6A, if the target object 62 matches the preset object, the controller controls the shooting parameter of the shooting device, for example, adjusts the focal length of the shooting device and/or controls the shooting attitude of the shooting device, according to the position information of the target object 62 in the shooting image, to cause the target object 62 to be maintained at the preset position of the shooting image, for example, cause the target object 62 to be maintained at the center position of the shooting image, thereby realizing the picture composition of the plurality of target objects.

In an example embodiment, the specific method and principle of controlling the control parameter of the shooting device are consistent with the above-described embodiments, which are omitted here.

In an example embodiment, the target object matching the preset object of the plurality of target objects is detected according to the position information of the plurality of target objects in the shooting image. The shooting parameter of the shooting device is controlled according to the position information of the target object matching the preset object of the plurality of target objects in the shooting image to cause the target object matching the preset object of the plurality of target objects to be at the preset position of the shooting image of the shooting device, thereby realizing the picture composition of the plurality of target objects by the shooting device in the selfie mode.

The shooting control method of the handheld gimbal consistent with the embodiments of the present disclosure includes, when the handheld gimbal is in the selfie mode, in the process of tracking and shooting the target object, according to the position information of the target object in the shooting image, adjusting the control parameter of the shooting device in real time to cause the configuration of the shooting device during the tracking and shooting process to be always the preset configuration, thereby causing the composition of the shooting image to meet the demand and avoiding manual operation by the user during the tracking and shooting. The method further includes displaying the shooting image in real time through the display screen to prevent the user from being unable to view the composition of the shooting image to affect the shooting effect of the handheld gimbal.

Figure 8:
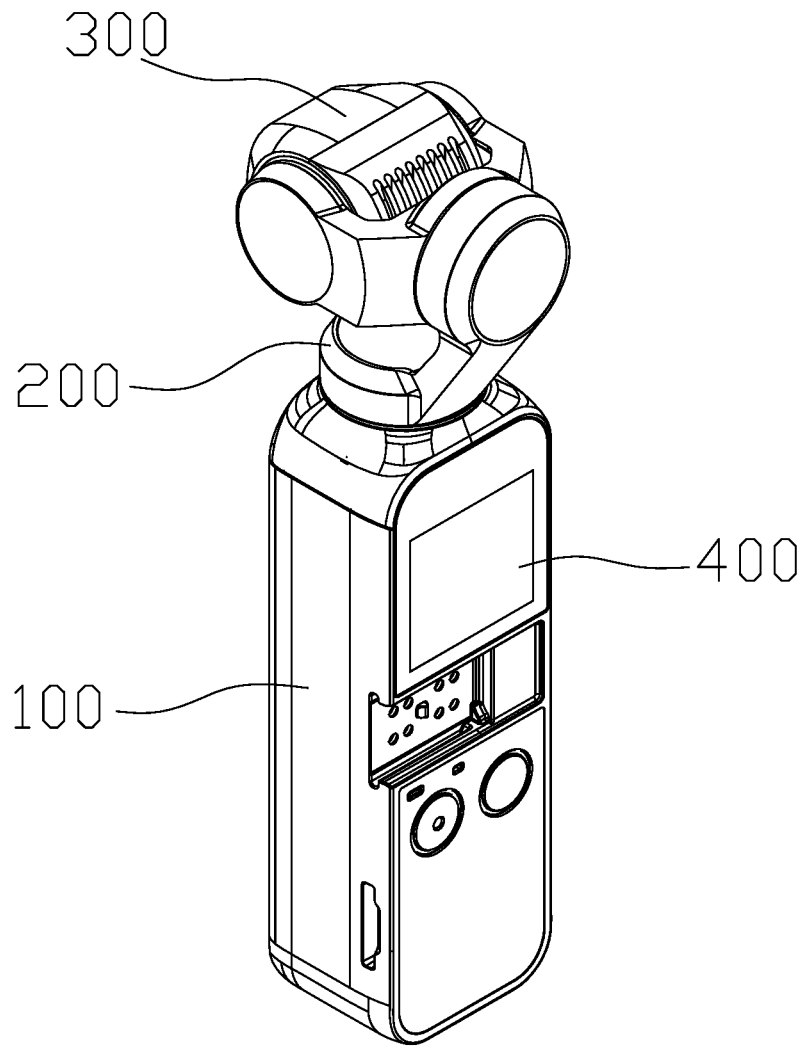
FIG. 8 is a perspective view of a handheld gimbal according to an example embodiment of the present disclosure.
Figure 9:
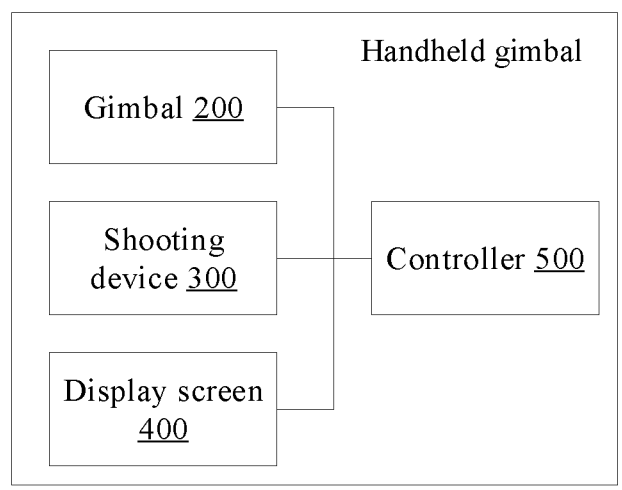
FIG. 9 is a structural block diagram of the handheld gimbal shown in FIG. 8.

With reference to FIGS. 8 and 9, a handheld gimbal consistent with an example embodiment of the present disclosure includes a handle 100, a gimbal 200 fixedly connected to the handle 100, a shooting device 300 mounted at the gimbal 200, a display screen 400 and a controller 500 provided on the handle 100. The controller 500 is electrically connected to the gimbal 200, the shooting device 300, and the display screen 400.

The shooting device 300 is used to shoot an image and send the image to the controller 500. The controller 500 is used to, according to the received image, when the handheld gimbal is in the selfie mode, determine the characteristic information of the target object, control the shooting device 300 to track and shoot the target object according to the characteristic information of the target object, determine the position information of the target object in the shooting image according to the characteristic information of the target object, adjust the control parameter of the shooting device 300 according to the position information of the target object in the shooting image to enable the shooting device 300 to shoot the target object in a preset configuration to obtain the shooting image, and control the display screen to display the shooting image in real time.

The handheld gimbal consistent with the embodiments shown in FIG. 8 and FIG. 9 can be used to implement the technical solutions of the above-described method embodiments. The implementation principles and technical effects are similar, which are omitted here.

In addition, the controller 500 may include a central processing unit (CPU). The controller 500 may further include a hardware chip. The hardware chip may include an application-specific integrated circuit (ASIC), a programmable logic device (PLD), or a combination thereof. The above-described PLD may include a complex programmable logic device (CPLD), a field-programmable gate array (FPGA), a generic array logic (GAL), or any combination thereof.

In addition, a computer-readable storage medium consistent with the embodiments of the present disclosure stores a computer program. When the program is executed by a processor, the processes of the shooting control method for a handheld gimbal consistent with the above-described embodiments can be implemented.

Those skilled in the art can understand that part or all of the processes of a method consistent with the embodiments can be implemented by instructing relevant hardware through a computer program. The computer program can be stored in a computer-readable storage medium. The computer program can include instructions that enable a computer device to perform part or all of a method consistent with the disclosure, such as one of the example methods described above. The storage medium can be any medium that can store program codes, for example, a magnetic disk, an optical disk, a read-only memory (ROM), or a random-access memory (RAM), etc.

What is claimed is:

1. A shooting control method comprising:
   determining a handheld gimbal is in a selfie mode;
   determining characteristic information of a target object;
   controlling a shooting device of the handheld gimbal to track and shoot the target object according to the characteristic information of the target object;
   determining position information of the target object in a shooting image according to the characteristic information of the target object;
   adjusting a control parameter of the shooting device according to the position information of the target object in the shooting image, to enable the shooting device to shoot the target object in a preset configuration to obtain the shooting image; and
   displaying the shooting image in real time on a display screen of the handheld gimbal.

2. The method of claim 1, wherein the preset configuration includes at least one of:
   a preset position of the target object in the shooting image of the shooting device; or
   a preset size of the target object in the shooting image of the shooting device.

3. The method of claim 2, further comprising, before controlling the shooting device to track and shoot the target object according to the characteristic information of the target object:
   obtaining a preview image shot by the shooting device; and
   displaying the preview image on the display screen.

4. The method of claim 3, further comprising, after displaying the preview image on the display screen:
   obtaining display position information of the target object set at the display screen; and
   setting the preset position to be a display position corresponding to the display position information.

5. The method of claim 4, wherein obtaining the display position information of the target object set at the display screen includes:
   obtaining a click operation on position indication information included in a menu set at the display screen; and
   determining the display position information of the target object according to the position indication information determined by the click operation.

6. The method of claim 4, wherein obtaining the display position information of the target object set at the display screen includes:
   obtaining a click operation performed by a user on the display screen for the preview image;
   determining a clicked image area according to the click operation;
   obtaining a drag operation on the determined clicked image area; and
   determining the display position information of the target object according to position information of the clicked image area after being dragged by the drag operation.

7. The method of claim 4, wherein obtaining the display position information of the target object set at the display screen includes:
   obtaining a frame selection operation performed by a user on the display screen with for the preview image;
   determining a frame-selected image area according to the frame selection operation;
   obtaining a drag operation on the determined frame-selected image area; and
   determining the display position information of the target object according to position information of the frame-selected image area after being dragged by the drag operation.

8. The method of claim 3, further comprising, after displaying the preview image shot by the shooting device on the display screen:
   obtaining display size information of the target object set at the display screen; and
   setting the preset size to be a display size corresponding to the display size information.

9. The method of claim 2, wherein:
   the control parameter includes a shooting attitude; and
   adjusting the control parameter of the shooting device according to the position information of the target object in the shooting image, to enable the shooting device to shoot the target object in the preset configuration to obtain the shooting image includes:
   adjusting the shooting attitude of the shooting device according to the position information of the target object in the shooting image, to cause the target object to be at the preset position of the shooting image.

10. The method of claim 9, further comprising:
    cropping an area including the target object in the shooting image to cause the target object to be at the preset position of the shooting image.

11. The method of claim 9, wherein:
    the shooting device is mounted at a gimbal of the handheld gimbal; and
    adjusting the shooting attitude of the shooting device includes adjusting the shooting attitude of the shooting device by controlling an attitude of the gimbal.

12. The method of claim 11, further comprising, after adjusting the shooting attitude of the shooting device by controlling the attitude of the gimbal:
    determining a reliability of a target shooting image according to the characteristic information of the target object and tracking information of the target object determined in the target shooting image, the reliability being configured to indicate a tracking accuracy of the target shooting image obtained by the shooting device tracking and shooting the target object determined at the preview image; and
    determining the attitude of the gimbal according to the reliability.

13. The method of claim 12, wherein determining the attitude of the gimbal according to the reliability includes:
    in response to the reliability being less than a preset threshold, performing a full image detection on the target shooting image;
    in response to the target object existing in a detection result, obtaining detection position information of the target object in the target shooting image; and
    determining the attitude of the gimbal according to the detection position information and the position information corresponding to the preset position.

14. The method of claim 13, wherein determining the attitude of the gimbal according to the detection position information and the position information corresponding to the preset position includes:
    determining a rotation angle of the gimbal according to the detection position information and the position information corresponding to the preset position.

15. The method of claim 2, wherein:

the control parameter includes a shooting parameter; and adjusting the control parameter of the shooting device according to the position information of the target object in the shooting image, to enable the shooting device to shoot the target object in the preset configuration to obtain the shooting image includes:

adjusting the shooting parameter of the shooting device according to the position information of the target object in the shooting image, to keep the target object with the preset size in the shooting image.

16. A handheld gimbal comprising:

a handle;

a gimbal fixedly connected to the handle;

a shooting device mounted at the gimbal and configured to shoot images;

a display screen provided at the handle; and a controller electrically connected to the gimbal, the shooting device, and the display screen, and configured to receive images shot by the shooting device and, according to the received image:

determine whether the handheld gimbal is in a selfie mode;

determine characteristic information of a target object;

control the shooting device to track and shoot the target object according to the characteristic information of the target object;

determine position information of the target object in a shooting image according to the characteristic information of the target object;

adjust a control parameter of the shooting device according to the position information of the target object in the shooting image, to enable the shooting device to shoot the target object in a preset configuration to obtain the shooting image; and control the display screen to display the shooting image in real time.

17. The handheld gimbal of claim 16, wherein the preset configuration includes at least one of:

a preset position of the target object in the shooting image of the shooting device; or a preset size of the target object in the shooting image of the shooting device.

18. The handheld gimbal of claim 17, wherein the controller is further configured to, before controlling the shooting device to track and shoot the target object according to the characteristic information of the target object:

obtain a preview image taken by the shooting device; and control the display screen to display the preview image.

19. The handheld gimbal of claim 17, wherein:

the control parameter includes a shooting attitude; and the controller is further configured to:

adjust the shooting attitude of the shooting device according to the position information of the target object in the shooting image, to cause the target object to be at the preset position of the shooting image.

20. The handheld gimbal of claim 19, wherein the controller is further configured to:

adjust the shooting attitude of the shooting device by controlling an attitude of the gimbal.

\* \* \* \* \*